(12) United States Patent
Lundberg (10) Patent No.: US 12,482,315 B2
(45) Date of Patent: Nov. 25, 2025

(54) PRIVACY-ENHANCED DELEGATION OF ACCESS RIGHT

(71) Applicant: ASSA ABLOY AB, Stockholm (SE)

(72) Inventor: Frans Lundberg, Saltsjöbaden (SE)

(73) Assignee: ASSA ABLOY AB, Stockholm (SE)

( * ) Notice: Subject to any disclaimer, the term of this patent is extended or adjusted under 35 U.S.C. 154(b) by 229 days.

(21) Appl. No.: 18/547,953

(22) PCT Filed: Feb. 22, 2022

(86) PCT No.: PCT/EP2022/054376
§ 371 (c)(1),
(2) Date: Aug. 25, 2023

(87) PCT Pub. No.: WO2022/184500
PCT Pub. Date: Sep. 9, 2022

(65) Prior Publication Data
US 2024/0296704 A1    Sep. 5, 2024

(30) Foreign Application Priority Data
Mar. 1, 2021    (SE) .................................... 2150223-2

(51) Int. Cl.
*G07C 9/00*    (2020.01)
*H04L 9/08*    (2006.01)
(Continued)

(52) U.S. Cl.
CPC ..... *G07C 9/00309* (2013.01); *G07C 9/00857* (2013.01); *H04L 9/0861* (2013.01);
(Continued)

(58) Field of Classification Search
CPC ............ G07C 9/00309; G07C 9/00857; G07C 2009/00412; G07C 2009/00825; H04L 9/0861; H04L 9/3073; H04L 9/3234
See application file for complete search history.

(56) References Cited

U.S. PATENT DOCUMENTS

2002/0161999 A1    10/2002    Gunter et al.
2011/0208970 A1    8/2011    Brown et al.
(Continued)

FOREIGN PATENT DOCUMENTS

| CN | 109243020 | 1/2019 |
|---|---|---|
| EP | 3244568 | 11/2017 |

(Continued)

OTHER PUBLICATIONS

"International Application Serial No. PCT EP2022054376 Written Opinion mailed Jan. 19, 2023", (Jan. 19, 2023), 9 pages.
(Continued)

*Primary Examiner* — Hee K Song
(74) *Attorney, Agent, or Firm* — Woessner, Lundberg & Woessner, P.A.

(57) ABSTRACT

It is provided a method for providing a privacy-enhanced delegated access right to unlock a physical lock. The method comprises: obtaining a derivation scalar; receiving a cryptographically signed delegation from the delegator device, the delegation being a data object comprising a public key of the delegator device, a public key of the physical lock, and a derived public key for the delegatee device, and wherein the delegation is cryptographically signed using a secret key that is paired with the public key of the delegator device; obtaining a source secret key for the delegatee device, the source secret key being paired with the source public key; calculating a derived secret key for the delegatee device using the source secret key for the delegatee device and the derivation scalar; providing the delegation to the physical lock; and authenticating the delegatee device with the physical lock using the derived secret key.

22 Claims, 3 Drawing Sheets

(51) Int. Cl.
*H04L 9/30*     (2006.01)
*H04L 9/32*     (2006.01)

(52) U.S. Cl.
CPC .......... *H04L 9/3073* (2013.01); *H04L 9/3234* (2013.01); *G07C 2009/00412* (2013.01); *G07C 2009/00825* (2013.01)

(56) References Cited

U.S. PATENT DOCUMENTS

| | | | |
|---|---|---|---|
| 2016/0358397 A1* | 12/2016 | Kristensen | G07C 9/00309 |
| 2018/0241570 A1 | 8/2018 | Pang et al. | |
| 2020/0106774 A1 | 4/2020 | Lerch et al. | |
| 2020/0313898 A1 | 10/2020 | Troia et al. | |
| 2022/0028198 A1* | 1/2022 | Lundberg | G07C 9/00309 |
| 2024/0296704 A1* | 9/2024 | Lundberg | G07C 9/00309 |

FOREIGN PATENT DOCUMENTS

| | | |
|---|---|---|
| EP | 3671663 | 6/2020 |
| EP | 3751814 | 12/2020 |
| WO | 2015030553 | 3/2015 |
| WO | 2022184500 | 9/2022 |

OTHER PUBLICATIONS

"International Application Serial No. PCT EP2022054376 IRPR mailed May 30, 2023", (May 30, 2023), 24 pages.
"Application 2150223-2 Search Report mailed Nov. 18, 2021", (Nov. 18, 2021), 7 pages.
"International Application Serial No. PCT EP2022054376 ISR and WO mailed Jun. 3, 2022", (Jun. 3, 2022), 16 pages.

* cited by examiner

PRIVACY-ENHANCED DELEGATION OF ACCESS RIGHT

CROSS-REFERENCE TO RELATED APPLICATION(S)

This application is a national stage application under 35 U.S.C. § 371 of PCT Appl. No. PCT/EP2022/054376, titled "Privacy-Enhanced Delegation of Access Right," filed Feb. 22, 2022, which claims priority to Swedish Patent Appl. No. 2150223-2, filed Mar. 1, 2021, each of which is incorporated herein by reference in its entirety.

TECHNICAL FIELD

The present disclosure relates to the field of access rights for physical locks, and in particular to a privacy-enhanced delegation of an access right to unlock a physical lock.

BACKGROUND

Locks and keys are evolving from the traditional pure mechanical locks. These days, electronic locks are becoming increasingly common. For electronic locks, no mechanical key profile is needed for authentication of a user. The electronic locks can e.g. be opened using an electronic key stored on a special carrier (fob, card, etc.) or in a smartphone. The electronic key and electronic lock can e.g. communicate over a wireless interface. Such electronic locks provide a number of benefits, including improved flexibility in management of access rights, audit trails, key management, etc.

Some electronic locks also enable delegation, such that a lock owner can delegate an access right to a delegatee, to open a physical lock, e.g. for the delegator providing a service or performing a delivery. However, the delegatee may want to avoid being tracked to ensure privacy.

SUMMARY

One object is to provide a solution for delegation of access rights where the privacy for the delegatee of the delegation is improved.

According to a first aspect, it is provided a method for providing a privacy-enhanced delegated access right to unlock a physical lock. The method being performed by a delegatee device, for which the access right is delegated by a delegator device. The method comprises: obtaining a derivation scalar; receiving a cryptographically signed delegation from the delegator device, the delegation being a data object comprising a public key of the delegator device, a public key of the physical lock, and a derived public key for the delegatee device, wherein the derived public key is derivable using a source public key of the delegatee device and the derivation scalar, and wherein the delegation is cryptographically signed using a secret key that is paired with the public key of the delegator device; obtaining a source secret key for the delegatee device, the source secret key being paired with the source public key; calculating a derived secret key for the delegatee device using the source secret key for the delegatee device and the derivation scalar; providing the delegation to the physical lock; and authenticating the delegatee device with the physical lock using the derived secret key.

The calculating the derived secret key may comprise calculating the derived secret key by adding the derivation scalar to the source secret key.

The method may further comprise: verifying that the derived public key is derivable using a source public key of the delegatee device and the derivation scalar.

The delegatee device may refrain from providing the derivation scalar to the physical lock.

The obtaining the derivation scalar may comprises receiving the derivation scalar from the delegator device.

All of the public keys may be elements of a group that satisfy the following criteria: there is a group operation for adding two elements, that has some properties that are equivalent to addition of numbers; there is a scalar multiplication operation that is at least partly equivalent to number multiplication, in that the scalar multiplication of a factor element with an integer factor yields an element product that is equal to a group operation of the integer factor number of factor elements, wherein the element product is an element of the group; and it is infeasible to derive the integer factor based on knowing the element product and the element factor.

The group may be based on elliptic-curve cryptography.

The obtaining a derivation scalar may comprise receiving the derivation scalar from the delegator device. Alternatively, the obtaining a derivation scalar may comprise generating the derivation scalar.

According to a second aspect, it is provided a delegatee device for providing a privacy-enhanced delegated access right to unlock a physical lock. The delegatee device comprises: a processor; and a memory storing instructions that, when executed by the processor, cause the delegatee device to: obtain a derivation scalar; receive a cryptographically signed delegation from the delegator device, the delegation being a data object comprising a public key of the delegator device, a public key of the physical lock, and a derived public key for the delegatee device, wherein the derived public key is derivable using a source public key of the delegatee device and the derivation scalar, and wherein the delegation is cryptographically signed using a secret key that is paired with the public key of the delegator device; obtain a source secret key for the delegatee device, the source secret key being paired with the source public key; calculate a derived secret key for the delegatee device using the source secret key for the delegatee device and the derivation scalar; provide the delegation to the physical lock; and authenticate the delegatee device with the physical lock using the derived secret key.

The instructions to calculate the derived secret key may comprise instructions that, when executed by the processor, cause the delegatee device to calculate the derived secret key by adding the derivation scalar to the source secret key.

The delegatee device may further comprise instructions that, when executed by the processor, cause the delegatee device to: verify that the derived public key is derivable using a source public key of the delegatee device and the derivation scalar.

The delegatee device may further comprise instructions that, when executed by the processor, cause the delegatee device to refrain from providing the derivation scalar to the physical lock.

The instructions to obtain the derivation scalar may comprise instructions that, when executed by the processor, cause the delegatee device to receive the derivation scalar from the delegator device.

All of the public keys may be elements of a group that satisfy the following criteria: there is a group operation for adding two elements, that has some properties that are equivalent to addition of numbers; there is a scalar multiplication operation that is at least partly equivalent to number multiplication, in that the scalar multiplication of a factor element with an integer factor yields an element product that is equal to a group operation of the integer factor number of factor elements, wherein the element product is an element an element of the group; and it is infeasible to derive the integer factor based on knowing the element product and the element factor.

The group may be based on elliptic-curve cryptography.

According to a third aspect, it is provided a computer program for providing a privacy-enhanced delegated access right to unlock a physical lock. The computer program comprises computer program code which, when executed on a delegatee device causes the delegatee device to: obtain a derivation scalar; receive a cryptographically signed delegation from a delegator device, the delegation being a data object comprising a public key of the delegator device, a public key of the physical lock, a derived public key for the delegatee device, wherein the derived public key is derivable using a source public key of the delegatee device and the derivation scalar, and wherein the delegation is cryptographically signed using a secret key that is paired with the public key of the delegator device; obtain a source secret key for the delegatee device, the source secret key being paired with the source public key; calculate a derived secret key for the delegatee device using the source secret key for the delegatee device and the derivation scalar; provide the delegation to the physical lock; and authenticate the delegatee device with the physical lock using the derived secret key.

According to a fourth aspect, it is provided a computer program product comprising a computer program according to the third aspect and a computer readable means on which the computer program is stored.

According to a fifth aspect, it is provided a method for providing a privacy-enhanced delegated access right to unlock a physical lock to a delegatee device. The method is performed by a delegator device. The method comprises: obtaining a derivation scalar; obtaining a source public key for the delegatee device; calculating a derived public key for the delegatee device based on the source public key and the derivation scalar; generating a delegation being a data object comprising a public key of the delegator device, a public key of the physical lock, and the derived public key for the delegatee device; cryptographically signing the delegation using a secret key paired with the public key of the delegator device; and sending the cryptographically signed delegation to the delegatee device The obtaining the derivation scalar may comprise generating the derivation scalar and the sending may comprise sending the derivation scalar to the delegatee device.

According to a sixth aspect, it is provided a delegator device for providing a privacy-enhanced delegated access right to unlock a physical lock to a delegatee device. The delegator device comprises: a processor; and a memory storing instructions that, when executed by the processor, cause the delegator device to: obtain a derivation scalar; obtain a source public key for the delegatee device; calculate a derived public key for the delegatee device based on the source public key and the derivation scalar; generate a delegation being a data object comprising a public key of the delegator device, a public key of the physical lock, and the derived public key for the delegatee device; cryptographically sign the delegation using a secret key paired with the public key of the delegator device; and send the cryptographically signed delegation to the delegatee device According to a seventh aspect, it is provided a computer program for providing a privacy-enhanced delegated access right to unlock a physical lock to a delegatee device. The computer program comprises computer program code which, when executed on a delegator device causes the delegator device to: a processor; and a memory storing instructions that, when executed by the processor, cause the delegator device to: obtain a derivation scalar; obtain a source public key for the delegatee device; calculate a derived public key for the delegatee device based on the source public key and the derivation scalar; generate a delegation being a data object comprising a public key of the delegator device, a public key of the physical lock, and the derived public key for the delegatee device; cryptographically sign the delegation using a secret key paired with the public key of the delegator device; and send the cryptographically signed delegation to the delegatee device According to an eighth aspect, it is provided a computer program product comprising a computer program according to the seventh aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown. These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Embodiments presented herein improve privacy of delegated access rights by providing, for a delegatee, a temporary public key that is derived based on a source public key and a derivation scalar. The same derivation scalar is used to derive a corresponding temporary secret key of the delegatee. The delegation is then delegated to the derived public key of the delegatee that, when presented to the lock, does not expose the source public key of the delegatee. Moreover, the delegatee can derive the derived secret key on its own based on the derivation scalar and its source secret key, so that the source secret key never needs to be exposed. Only the delegator and the delegatee is aware of the source public key of the delegatee. This prevents the lock from identifying or tracking the delegatee across communication sessions.

Figure 1:
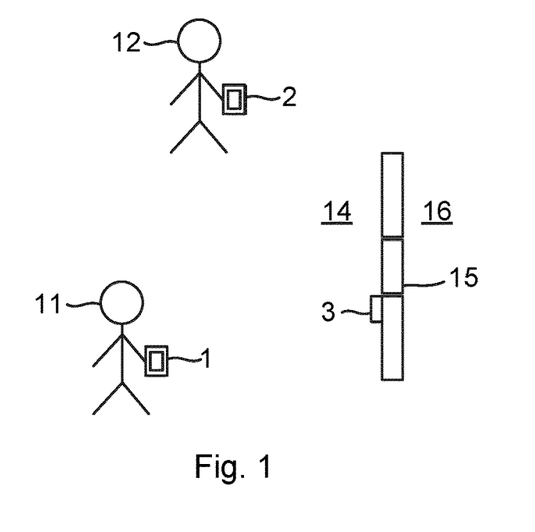
FIG. 1 is a schematic diagram illustrating an environment in which embodiments presented herein can be applied.

FIG. 1 is a schematic diagram illustrating an environment in which embodiments presented herein can be applied.

Access to a physical space 16 is restricted by a physical barrier 15 which is selectively unlockable. The physical barrier 15 stands between the restricted physical space 16 and an accessible physical space 14. Note that the accessible physical space 14 can be a restricted physical space in itself, but in relation to this physical barrier 15, the accessible physical space 14 is accessible. The barrier 15 can be a door, gate, hatch, cabinet door, drawer, window, etc. In order to control access to the physical space 16, by selectively unlocking the barrier 15, a physical lock 3 is provided. The physical lock 3 comprises an electronically controllable lock and communication circuitry for communicating with user devices, such as a delegator device 1 and a delegatee device 2.

The delegator device 1 is a device of a delegator 11 that has obtained access rights to the physical lock 3, e.g. by ownership of the physical lock 3. In other words, the delegator 11 can be the owner of the physical lock 3. The delegator 11 would like to give access to a delegatee 12 to open the physical lock 3, for any suitable reason. For instance, the delegatee 12 may need to provide a service to the delegator 11 such as repairs to the building or delivery of a package, for which the physical lock 3 needs to be opened.

In any case, the delegator 11 decides to delegate access rights to allow the delegatee 12 to unlock the physical lock 3 using her/his delegatee device 2. Each of the delegator device 1 and the delegatee device can e.g. be implemented using a smartphone, a wearable device or a dedicated credential carrier such as a key fob, key card, etc.

The delegation is performed by the delegator device 1 generating a data object according to the specification below, being the delegation, and providing the delegation to the delegatee device 2. The delegation is cryptographically signed by the delegator device 1. The delegatee device 2 later provides the delegation to the physical lock 3. The physical lock 3 verifies the validity of the delegation by verifying the signature using a public key of the delegator device 1, authenticates the delegatee device 2, and verifies the access rights granted by the delegation. If all of this passes, the lock device 3 sets itself in an unlocked state, allowing the delegatee 12 to access the restricted physical space 16. It is to be noted that the physical lock 3 can be completely offline for this process, as long as the physical lock 3 locally stores the public key of the delegator device 1.

In the following, 'A' denotes the public key of the delegator device, 'B' denotes the public key of the delegatee device, and 'C' denotes the public key of the physical lock. The structure of the data object being the delegation can be expressed according to the following:

```
signed(by:A) {
    from: A
    to: B
    for: C
    validity: when the delegation is valid
    conversations: unlock, lock, getStatus
}
```

The delegation (within the curly braces) is signed by the delegator device and is sent to the delegatee device. The delegation thus includes the public keys of the delegator device, the delegatee device and the physical lock. The delegation optionally also includes a validity expression that defines when the delegation is valid. For instance, the validity expression can consist of a start and end time of a single time interval. More complex definitions are also possible. The conversation field is a list of operations that the delegatee device is allowed to execute on the physical lock.

The last two fields (validity and conversations) are omitted in the following in the interest of brevity, whereby the delegation can be expressed as:

```
signed(by:A) {
    from: A
    to: B
    for: C
}
```

The delegation is sent to the delegatee device, which will thus forward the delegation to the physical lock 3. It is to be noted that for evaluating whether to grant access or not, the physical lock 3 does not need to know the identity B of the delegatee device; it just needs to know that the delegatee device is properly authorized and approved, as indicated by the signature of A.

According to embodiments presented herein, the lock will be unable to determine the true identity B of the delegatee device and will even be prevented from tracking the delegatee device over time. This is in line with the principle of least privilege; the physical lock should not know this information since it does not need to know it to perform its tasks.

To allow such anonymisation, instead of using B, which is the permanent public key of the delegatee device, a temporary key pair that is derived from B will be used in the delegation. A new derived key pair can be generated for each delegation. The physical lock can still determine whether the delegatee is authorised or not by verifying whether the delegator has approved that the particular delegatee device, that authenticates with the physical lock.

The delegation according to these embodiments has the following structure:

```
r
signed(by:A) {
    from: A
    to: B'
    for: C
}
```

B' is here a derived public key for the delegatee device, which is derived from the source public key B of the delegatee device, using a derivation scalar r. In order to understand how this is can be implemented, it will now be described how the public keys A, B, and C are elements of a group with some special properties. This group is a mathematical finite group for which the computational discrete logarithm problem is infeasible or practically impossible. One such group is based on Elliptic-Curve Cryptography (ECC), e.g. Curve25519. Another such group is based on finite field cryptography as specified in section 2.2.1 of RFC5931.

A group operation is defined for elements in the group and is denoted '+'. This group operation has some properties that are equivalent to addition of numbers. Specifically, one property of this group operation is commutative, i.e. A+B=B+A. In addition, the group has an order, defining the number of possible elements in the group, that is a large prime (typically in the order of $2^{256}$ when the group is an ECC group).

A group is a set, G, of elements and the group operation, +, is an operation that combines any two group elements, A and B, into a new group element (A+B). By definition, the following the four properties hold for any such group:

Closure: For any A, B in G, A+B is also in G

Associativity. For any A, B, C in G, (A+B)+C=A+(B+C)

Identity element. There exists an element 0 in G, such that 0+A=A+0=A for any A in G. We can call this element zero.

Inverse element. For each A in G, there exist an element, −A, for which (−A)+A=0 and A+(−A)=0.

Based on the group operation, a scalar multiplication can be defined. A scalar multiplication is a multiplication of a group element with a scalar (integer). The operation is denoted with '*', but this symbol can be omitted in the same way as is customary for ordinary multiplication.

In this disclosure, upper-case letters are used for group elements and lower-case letters are used for scalars.

In equation (1) below, C is the result of the scalar multiplication between the integer a and the group element B and C is also a group element.

$$C = a * B \quad (1)$$

Equation (1) can also be expressed with reverse notation with the first operand of * being a group element:

$$C = B * a \quad (2)$$

The scalar multiplication is defined as group operations of an integer number of elements. Here are some examples of scalar multiplications with the integers 0, 1, 2 and 3:

$$0 * A = o \quad (3)$$
$$1 * A = A \quad (4)$$
$$2 * A = A + A \quad (5)$$
$$3 * A = A + A + A \quad (6)$$

It is to be noted that equation 6, due to the associativity of the group, yields: (A+A)+A=A+(A+A). Also note that in Equation 3, the first zero (0) is an integer while the zero to the right is a group element. The same symbol is used for both the zero integer and the identity element of the group.

We continue with more examples for scalar multiplications with the integers 4, 8 and 16.

$$4 * A = A + A + A + A \quad (7)$$
$$8 * A = A + A + A + A + A + A + A + A \quad (8)$$
$$16 * A = \quad (9)$$
$$A+A+A+A+A+A+A+A+A+A+A+A+A+A+A+A$$

Equation 9 can be computed with 15 additions. However, this can be made much more efficient, utilising only four additions, by successive doublings.

$$2 * A = A + A \quad (10)$$
$$4 * A = 2 * A + 2 * A \quad (11)$$
$$8 * A = 4 * A + 4 * A \quad (12)$$
$$16 * A = 8 * A + 8 * A \quad (13)$$

One ECC group that can be used is based on Curve25519. The group of this elliptic curve has a size of roughly $2^{256}$. The security level is roughly $2^{128}$. That is, the number of operations required to break the crypto is in the order of $2^{128}$. Given a randomly chosen integer a (roughly between 0 and $2^{256}$), and a generator element of the group, G, we can compute:

$$A = a * G \quad (14)$$

in a number of additions that is in the order of $2^8$=256 additions. Due to the properties of the group, the inverse calculation: i.e. to compute a, given A, is infeasible, requiring a number of operations in the order of $2^{128}$.

The group will now be applied for key pairs, used in asymmetric cryptography. A key pair consists of a secret key and an associated public key. In the notation used herein, the delegator device A creates a key pair as follows. The delegator device randomly chooses a secret key being an integer a, and computes A=a*G. A is the public key for the delegator device A, that can be published and distributed freely. Similarly, the delegatee device randomly chooses a secret key b, and computes the public key B=b*G.

In other words, the public key is a group element and the secret key is an integer. When ECC is applied, the group element can be represented by a point e.g. as a coordinate pair x, y, where each coordinate can be of an order 2^256. When finite field cryptography is applied, the group element can be represented by a (typically large) integer where the integer can be in an order of 2^2048.

Going back to the delegation according to embodiments presented herein:

```
r
signed(by:A) {
    from: A
    to: B'
    for: C
}
```

B' is here a derived public key for the delegatee, which is derived from B using a derivation scalar r. B' can be calculated according to B'=B+r*G, where G is a generator for the group that the public keys A, B, and C belong to. '+' is here a group operation.

The delegation is signed by the delegator using a and provided to the delegatee device. The delegatee device can validate that B'=B+r*G and can calculate b'=b+r (integer addition). b'can then be used as the secret key that is associated with B'. The delegation is provided from the delegatee device to the physical lock, that verifies the signature of the delegation by A. The delegatee device can authenticate with the physical lock based on b', since B' is in the delegation, signed by A.

From the perspective of the physical lock, it is dealing with the delegatee device identified by B' and that proves its possession of b'. The physical lock never sees B, which is the true identity of the delegatee device. Whenever r changes, B' and b' change, allowing convenient and secure anonymisation of the delegations to the delegatee device, preventing identification and tracking of B. There is no indication to the physical lock of any relationship between successive B' from different values of r. At the same time, the delegator device A can rest assured that only B can use the delegation with the physical lock, since only by knowing the source secret key b, can the secret key b', corresponding to B', be calculated.

Since the operations related to r (B'=B+G*r and b'=b+r) are not resource demanding, r can change often, e.g. for each delegation to the delegatee device.

Figure 2:
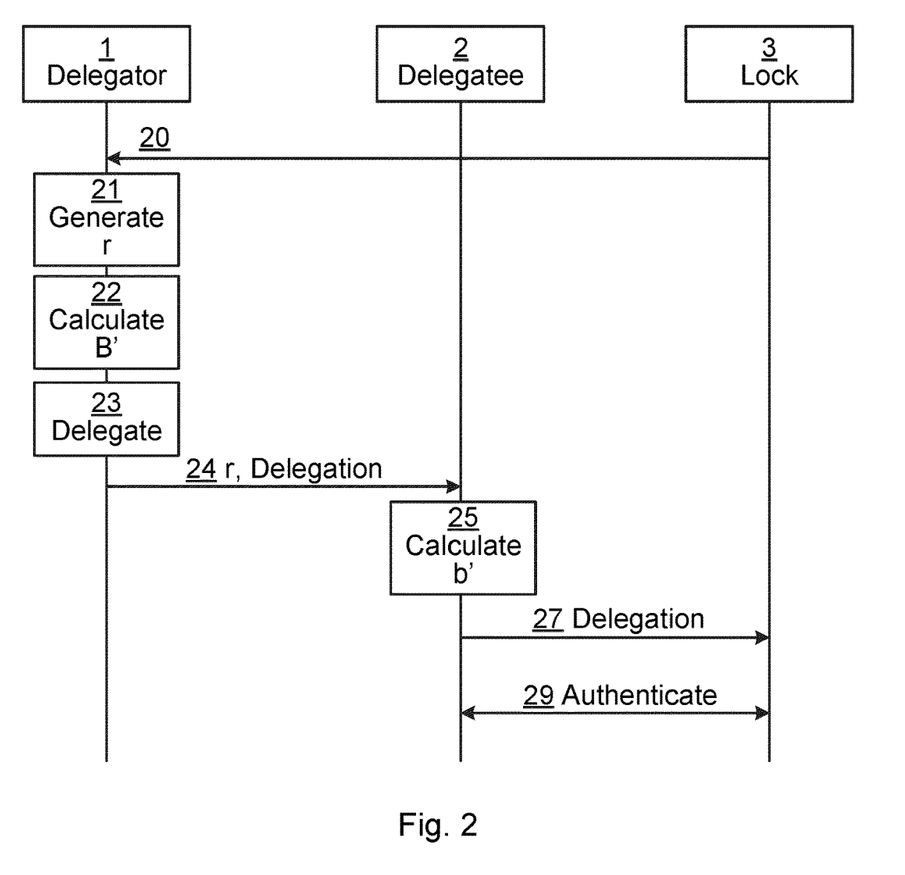
FIG. 2 is a sequence diagram illustrating communication between various entities of embodiments which can be applied in the environment of FIG. 1.

FIG. 2 is a sequence diagram illustrating communication between various entities of embodiments which can be applied in the environment of FIG. 1, for generating privacy enhanced delegations.

Prior to the sequence shown, the physical lock 3 communicates with the delegator device 1 to obtain its public key and configure that the physical lock 3 accepts the authority of the delegator device 1. For instance, the delegator device 1 can configure the physical lock 3 such that the delegator device 1 owns the physical lock 3.

When the delegator device 1 is to delegate access for the delegatee device 2 to the physical lock 3, the delegator first generates 21 the derivation scalar r and calculates 22 B' according to B'=B+G*r, where B is the source public key of the delegatee device 2 and B' is the derived public key of the delegatee device 2.

The delegator can now create 23 the delegation, cryptographically sign it, and send 24 the derivation scalar r and the delegation to the delegatee device 2.

The delegatee device 2 uses its source secret key b (corresponding to the source public key B of the delegatee device 2) and calculates 25 b' according to b'=b+r.

When the delegatee device 2 is by the physical lock 3, the delegatee device 2 provides the delegation 27 (but not the derivation scalar r) to the physical lock 3 and the delegatee device 2 authenticates 29 with the lock device 3 based on the derived public key B' in the delegation and the derived secret key b'.

The lock device 3 never sees or is able to derive the source public key B of the delegatee device.

Figure 3:
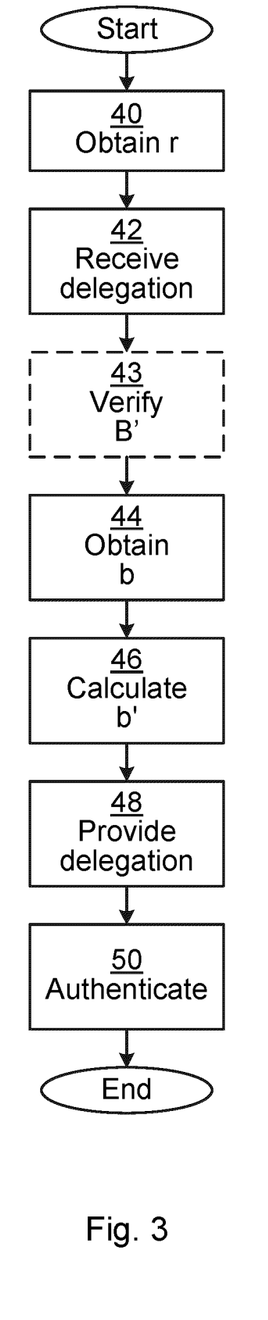
FIG. 3 is a flow chart illustrating embodiments of methods for providing a privacy-enhanced delegated access right to unlock a physical lock, where the method is performed by a delegatee device.

FIG. 3 is a flow chart illustrating embodiments of methods for providing a privacy-enhanced delegated access right to unlock a physical lock 3, where the method is performed by a delegatee device 2. The access right is delegated by a delegator device 1. The method roughly corresponds to the actions of the delegatee device 1 in the sequence diagram of FIG. 2.

In accordance with the description above, all public keys can be elements of a group that satisfy the following criteria:
  there is a group operation for adding two elements, that has some properties that are equivalent to addition of numbers
  there is a scalar multiplication operation that is at least partly equivalent to number multiplication, in that the scalar multiplication of a factor element with an integer factor yields an element product that is equal to a group operation of the integer factor number of factor elements, wherein the element product is an element of the group
  it is infeasible to derive the integer factor based on knowing the element product and the element factor.

For instance, the group can be based on elliptic-curve cryptography as described above.

In an obtain r step 40, the delegatee device 2 obtains a derivation scalar r. In one embodiment, illustrated in FIG. 2 and described above, the derivation scalar r is received from the delegator device 1. In one embodiment, the delegatee device 2 generates the derivation scalar r. In this case, the delegatee device 2 sends the derivation scalar r to the delegator device.

In a receive delegation step 42, the delegatee device 2 receives 42 a cryptographically signed delegation from the delegator device 1. The delegation is a data object comprising a public key A of the delegator device 1, a public key C of the physical lock 3, and a derived public key B' for the delegatee device 2. As explained above, the derived public key B' is derivable using a source public key B of the delegatee device 2 and the derivation scalar r. The delegation is cryptographically signed using a secret key that is paired with the public key A of the delegator device 1. The derivation scalar r that is obtained in step 40 can be sent in the same transmission as the delegation.

In an optional verify B' step 43, the delegatee device 2, verifies that the derived public key B' is derivable using a source public key B of the delegatee device 2 and the derivation scalar r. The delegatee device 2 calculates a derived public key B' based on the source public key B and the derivation scalar r and compares the result with the derived public key B' of the delegation.

In an obtain b step 44, the delegatee device 2 obtains a source secret key b for the delegatee device 2. The source secret key b is paired with the source public key. In other words, the source secret key b of the delegatee device 2 and the source public key B of the delegatee device 2 form a key pair. The source secret key b can e.g. be obtained by reading an internal memory in the delegatee device 2.

In a calculate b' step 46, the delegatee device 2 calculates a derived secret key b' for the delegatee device 2 using the source secret key b for the delegatee device 2 and the derivation scalar r. For instance, the derived secret key can be calculated as the result of adding the derivation scalar r to the source secret key b, i.e. b'=b+r.

In a provide delegation step 48, the delegatee device 2 provides the delegation to the physical lock 3, e.g. using local wireless communication. The delegatee device 2 does not need to provide the derivation scalar r to the physical lock 3. In fact, by refraining from providing the derivation scalar r to the physical lock 3, it is infeasible for the physical lock 3 to know or derive the source public key B of the delegatee device.

In an authenticate step 50, the delegatee device 2 authenticates the delegatee device with the physical lock using the derived secret key.

Figure 4:
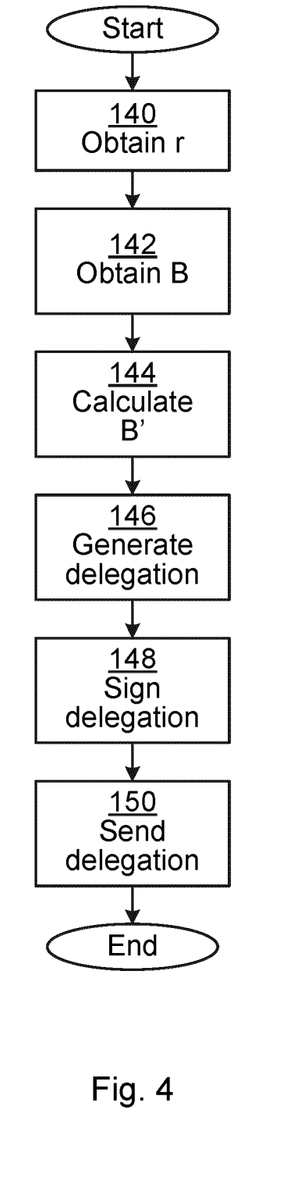
FIG. 4 is a flow chart illustrating embodiments of methods for providing a privacy-enhanced delegated access right to unlock a physical lock, where the method is performed by a delegator device.

FIG. 4 is a flow chart illustrating embodiments of methods for providing a privacy-enhanced delegated access right to unlock a physical lock, where the method is performed by a delegator device. The method roughly corresponds to the actions of the delegator device 1 in the sequence diagram of FIG. 2.

In a generate r step 140, the delegator device 1 obtains the derivation scalar r. For instance, the delegator device 1 can generate the derivation scalar r. Alternatively, if the derivation scalar is generated in the delegatee device, the derivation scalar r is received from the delegatee device 2.

In an obtain B step 142, the delegator device 1 obtains a source public key B for the delegatee device 2, e.g. from storage, a public repository or in a message from the delegatee device 2.

In a calculate B' step 144, the delegator device 1 calculates a derived public key B' for the delegatee device 2 based on the source public key B and the derivation scalar r.

In a generate delegation step 146, the delegator device 1 generates a delegation, being a data object comprising a public key A of the delegator device 1, a public key C of the physical lock 3, and the derived public key B' for the delegatee device 2.

In a sign delegation step 148, the delegator device 1 cryptographically signs the delegation using a secret key paired with the public key A of the delegator device 1.

In a send delegation step 150, the delegator device 1 sends and the cryptographically signed delegation to the delegatee device 2. When the derivation scalar is generated in the delegator device 1, this step also comprises sending the derivation scalar r to the delegatee device 2. In this case, the delegation and the derivation scalar r can be sent in a single message or using several messages. Alternatively, the generation of the derivation scalar r occurs in parallel by the delegator device 1 and the delegatee device 2 using the same algorithm, in which case, the derivation scalar r does not need to be communicated between the delegator device 1 and the delegatee device 2.

Figure 5:
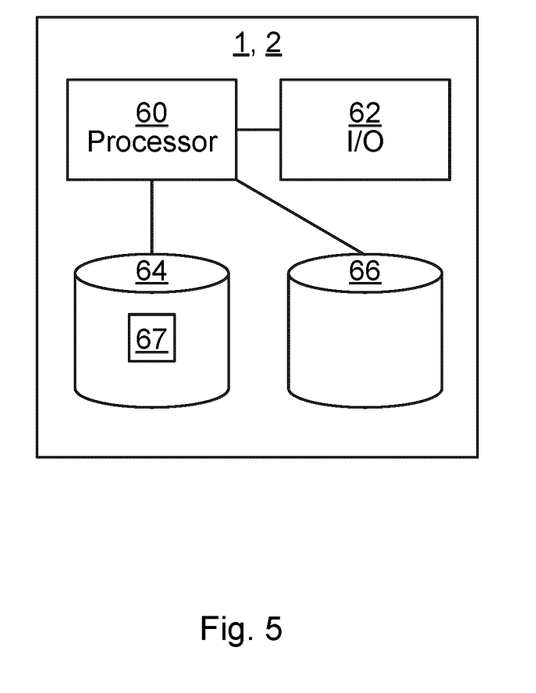
FIG. 5 is a schematic diagram illustrating components of the delegator device and the delegatee device of FIG. 1 according to one embodiment.

FIG. 5 is a schematic diagram illustrating components of the delegator device and the delegatee device of FIG. 1 according to one embodiment. Each one of these devices contain the mentioned components, optionally shared with a host device. A processor 60 is provided using any combination of one or more of a suitable central processing unit (CPU), graphics processing unit (GPU), multiprocessor, microcontroller, digital signal processor (DSP), etc., capable of executing software instructions 67 stored in a memory 64, which can thus be a computer program product. The processor 60 could alternatively be implemented using an application specific integrated circuit (ASIC), field programmable gate array (FPGA), etc. The processor 60 can be configured to execute the method described with reference to FIGS. 3 and 4 above.

The memory 64 can be any combination of random-access memory (RAM) and/or read-only memory (ROM). The memory 64 also comprises persistent storage, which, for example, can be any single one or combination of magnetic memory, optical memory, solid-state memory or even remotely mounted memory.

A data memory 66 is also provided for reading and/or storing data during execution of software instructions in the processor 60. The data memory 66 can be any combination of RAM and/or ROM.

An I/O interface 62 is also provided for communicating with external and/or internal entities. Optionally, the I/O interface 62 also includes a user interface.

Other components of the delegator device 1 and the delegatee device 2 are omitted in order not to obscure the concepts presented herein.

Figure 6:
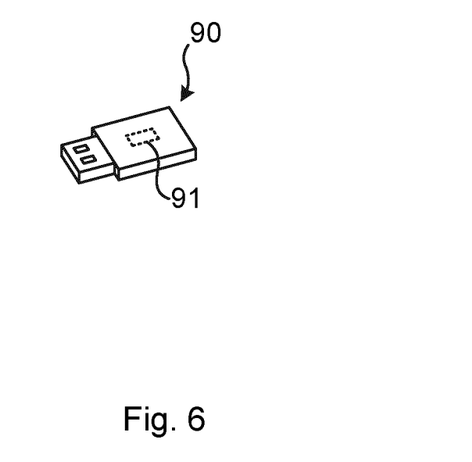
FIG. 6 shows one example of a computer program product comprising computer readable means.

FIG. 6 shows one example of a computer program product comprising computer readable means. On this computer readable means, a computer program 91 can be stored, which computer program can cause a processor to execute a method according to embodiments described herein. In this example, the computer program product is in the form of a removable solid-state memory, e.g. a Universal Serial Bus (USB) drive. As explained above, the computer program product could also be embodied in a memory of a device, such as the computer program product 64 of FIG. 5. While the computer program 91 is here schematically shown as a section of the removable solid-state memory, the computer program can be stored in any way which is suitable for the computer program product, such as another type of removable solid-state memory, or an optical disc, such as a CD (compact disc), a DVD (digital versatile disc) or a Blu-Ray disc.

A number of embodiments are now presented, enumerated with roman numerals.

i. A method for providing a privacy-enhanced delegated access right to unlock a physical lock, the method being performed by a delegatee device, for which the access right is delegated by a delegator device, the method comprising:
  obtaining a derivation scalar;
  receiving a cryptographically signed delegation from the delegator device, the delegation being a data object comprising a public key of the delegator device, a public key of the physical lock, and a derived public key for the delegatee device, wherein the derived public key is derivable using a source public key of the delegatee device and the derivation scalar, and wherein the delegation is cryptographically signed using a secret key that is paired with the public key of the delegator device;
  obtaining a source secret key for the delegatee device, the source secret key being paired with the source public key;
  calculating a derived secret key for the delegatee device using the source secret key for the delegatee device and the derivation scalar;
  providing the delegation to the physical lock; and
  authenticating the delegatee device with the physical lock using the derived secret key.

ii. The method according to embodiment i, wherein the calculating the derived secret key comprises calculating the derived secret key by adding the derivation scalar to the source secret key.

iii. The method according to embodiment i or ii, further comprising:
  verifying that the derived public key is derivable using a source public key of the delegatee device and the derivation scalar.

iv. The method according to any one of the preceding embodiments, wherein the delegatee device refrains from providing the derivation scalar to the physical lock.

V. The method according to any one of the preceding embodiments, wherein the obtaining the derivation scalar comprises receiving the derivation scalar from the delegator device.

vi. The method according to any one of the preceding embodiments, wherein all of the public keys are elements of a group that satisfy the following criteria:
  there is a group operation for adding two elements, that has some properties that are equivalent to addition of numbers;
  there is a scalar multiplication operation that is at least partly equivalent to number multiplication, in that the scalar multiplication of a factor element with an integer factor yields an element product that is equal to a group operation of the integer factor number of factor elements, wherein the element product is an element of the group; and it is infeasible to derive the integer factor based on knowing the element product and the element factor.

vii. The method according to embodiment vi, wherein the group is based on elliptic-curve cryptography.

viii. A delegatee device for providing a privacy-enhanced delegated access right to unlock a physical lock, the delegatee device comprising:
- a processor; and
- a memory storing instructions that, when executed by the processor, cause the delegatee device to:
- obtain a derivation scalar;
- receive a cryptographically signed delegation from the delegator device, the delegation being a data object comprising a public key of the delegator device, a public key of the physical lock, and a derived public key for the delegatee device, wherein the derived public key is derivable using a source public key of the delegatee device and the derivation scalar, and wherein the delegation is cryptographically signed using a secret key that is paired with the public key of the delegator device;
- obtain a source secret key for the delegatee device, the source secret key being paired with the source public key;
- calculate a derived secret key for the delegatee device using the source secret key for the delegatee device and the derivation scalar;
- provide the delegation to the physical lock; and
- authenticate the delegatee device with the physical lock using the derived secret key.

ix. The delegatee device according to embodiment viii, wherein the instructions to calculate the derived secret key comprise instructions that, when executed by the processor, cause the delegatee device to calculate the derived secret key by adding the derivation scalar to the source secret key.

XX. The delegatee device according to embodiment viii or ix, further comprising instructions that, when executed by the processor, cause the delegatee device to:
verify that the derived public key is derivable using a source public key of the delegatee device and the derivation scalar.

xi. The delegatee device according to any one of embodiments viii to x, further comprising instructions that, when executed by the processor, cause the delegatee device to refrain from providing the derivation scalar to the physical lock.

xii. The delegatee device according to any one of embodiments viii to xi, wherein the instructions to obtain the derivation scalar comprise instructions that, when executed by the processor, cause the delegatee device to receive the derivation scalar from the delegator device.

xiii. The delegatee device according to any one of embodiments viii to xii, wherein all of the public keys are elements of a group that satisfy the following criteria:
there is a group operation for adding two elements, that has some properties that are equivalent to addition of numbers;
there is a scalar multiplication operation that is at least partly equivalent to number multiplication, in that the scalar multiplication of a factor element with an integer factor yields an element product that is equal to a group operation of the integer factor number of factor elements, wherein the element product is an element an element of the group; and it is infeasible to derive the integer factor based on knowing the element product and the element factor.

xiv. The delegatee device according to embodiment xiii, wherein the group is based on elliptic-curve cryptography.

xv. A computer program for providing a privacy-enhanced delegated access right to unlock a physical lock, the computer program comprising computer program code which, when executed on a delegatee device causes the delegatee device to:
obtain a derivation scalar;
receive a cryptographically signed delegation from a delegator device, the delegation being a data object comprising a public key of the delegator device, a public key of the physical lock, a derived public key for the delegatee device, wherein the derived public key is derivable using a source public key of the delegatee device and the derivation scalar, and wherein the delegation is cryptographically signed using a secret key that is paired with the public key of the delegator device;
obtain a source secret key for the delegatee device, the source secret key being paired with the source public key;
calculate a derived secret key for the delegatee device using the source secret key for the delegatee device and the derivation scalar;
provide the delegation to the physical lock; and
authenticate the delegatee device with the physical lock using the derived secret key.

xvi. A computer program product comprising a computer program
according to embodiment xv and a computer readable means on which the computer program is stored.

xvii. A method for providing a privacy-enhanced delegated access right to unlock a physical lock to a delegatee device, the method being performed by a delegator device, the method comprising:
generating a derivation scalar;
obtaining a source public key for the delegatee device;
calculating a derived public key for the delegatee device based on the source public key and the derivation scalar;
generating a delegation being a data object comprising a public key of the delegator device, a public key of the physical lock, and the derived public key for the delegatee device;
cryptographically signing the delegation using a secret key paired with the public key of the delegator device; and
sending the derivation scalar and the cryptographically signed delegation to the delegatee device xviii. A delegator device for providing a privacy-enhanced delegated access right to unlock a physical lock to a delegatee device, the delegator device comprising:
a processor; and
a memory storing instructions that, when executed by the processor, cause the delegator device to:
generate a derivation scalar;
obtain a source public key for the delegatee device;
calculate a derived public key for the delegatee device based on the source public key and the derivation scalar;
generate a delegation being a data object comprising a public key of the delegator device, a public key of the physical lock, and the derived public key for the delegatee device;

cryptographically sign the delegation using a secret key paired with the public key of the delegator device; and send the derivation scalar and the cryptographically signed delegation to the delegatee device xix. A computer program for providing a privacy-enhanced delegated access right to unlock a physical lock to a delegatee device, the computer program comprising computer program code which, when executed on a delegator device causes the delegator device to:

a processor; and a memory storing instructions that, when executed by the processor, cause the delegator device to:

generate a derivation scalar;

obtain a source public key for the delegatee device;

calculate a derived public key for the delegatee device based on the source public key and the derivation scalar;

generate a delegation being a data object comprising a public key of the delegator device, a public key of the physical lock, and the derived public key for the delegatee device;

cryptographically sign the delegation using a secret key paired with the public key of the delegator device; and send the derivation scalar and the cryptographically signed delegation to the delegatee device XX. A computer program product comprising a computer program according to embodiment xix and a computer readable means on which the computer program is stored.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims. Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method for providing a privacy-enhanced delegated access right to unlock a physical lock, the method being performed by a delegatee device, for which the access right is delegated by a delegator device, the method comprising:

obtaining a derivation scalar;

receiving a cryptographically signed delegation from the delegator device, the delegation being a data object comprising a public key of the delegator device, a public key of the physical lock, and a derived public key for the delegatee device, wherein the derived public key is derivable using a source public key of the delegatee device and the derivation scalar, and wherein the delegation is cryptographically signed using a secret key that is paired with the public key of the delegator device;

obtaining a source secret key for the delegatee device, the source secret key being paired with the source public key;

calculating a derived secret key for the delegatee device using the source secret key for the delegatee device and the derivation scalar, wherein the derived secret key and the derived public key form a temporary key pair;

providing the delegation to the physical lock; and authenticating the delegatee device with the physical lock using the derived secret key.

2. The method according to claim 1, wherein the calculating the derived secret key comprises calculating the derived secret key by adding the derivation scalar to the source secret key.

3. The method according to claim 1, further comprising:

verifying that the derived public key is derivable using a source public key of the delegatee device and the derivation scalar.

4. The method according to claim 1, wherein the delegatee device refrains from providing the derivation scalar to the physical lock.

5. The method according to claim 1, wherein the obtaining the derivation scalar comprises receiving the derivation scalar from the delegator device.

6. The method according to claim 1, wherein all of the public keys are elements of a group that satisfy the following criteria:

there is a group operation for adding two elements, that has some properties that are equivalent to addition of numbers;

there is a scalar multiplication operation that is at least partly equivalent to number multiplication, in that the scalar multiplication of a factor element with an integer factor yields an element product that is equal to a group operation of the integer factor number of factor elements, wherein the element product is an element of the group; and it is infeasible to derive the integer factor based on knowing the element product and the element factor.

7. The method according to claim 6, wherein the group is based on elliptic-curve cryptography.

8. The method according to claim 1, wherein the obtaining a derivation scalar comprises receiving the derivation scalar from the delegator device.

9. The method according to claim 1, wherein the obtaining a derivation scalar comprises generating the derivation scalar.

10. A delegatee device for providing a privacy-enhanced delegated access right to unlock a physical lock, the delegatee device comprising:

a processor; and a memory storing instructions that, when executed by the processor, cause the delegatee device to:

obtain a derivation scalar;

receive a cryptographically signed delegation from the delegator device, the delegation being a data object comprising a public key of the delegator device, a public key of the physical lock, and a derived public key for the delegatee device, wherein the derived public key is derivable using a source public key of the delegatee device and the derivation scalar, and wherein the delegation is cryptographically signed using a secret key that is paired with the public key of the delegator device;

obtain a source secret key for the delegatee device, the source secret key being paired with the source public key;

calculate a derived secret key for the delegatee device using the source secret key for the delegatee device and the derivation scalar, wherein the derived secret key and the derived public key form a temporary key pair;

provide the delegation to the physical lock; and authenticate the delegatee device with the physical lock using the derived secret key.

11. The delegatee device according to claim 10, wherein the instructions to calculate the derived secret key comprise instructions that, when executed by the processor, cause the delegatee device to calculate the derived secret key by adding the derivation scalar to the source secret key.

12. The delegatee device according to claim 10, further comprising instructions that, when executed by the processor, cause the delegatee device to:
verify that the derived public key is derivable using a source public key of the delegatee device and the derivation scalar.

13. The delegatee device according to claim 10, further comprising instructions that, when executed by the processor, cause the delegatee device to refrain from providing the derivation scalar to the physical lock.

14. The delegatee device according to claim 10, wherein the instructions to obtain the derivation scalar comprise instructions that, when executed by the processor, cause the delegatee device to receive the derivation scalar from the delegator device.

15. The delegatee device according to claim 10, wherein all of the public keys are elements of a group that satisfy the following criteria:
there is a group operation for adding two elements, that has some properties that are equivalent to addition of numbers;
there is a scalar multiplication operation that is at least partly equivalent to number multiplication, in that the scalar multiplication of a factor element with an integer factor yields an element product that is equal to a group operation of the integer factor number of factor elements, wherein the element product is an element an element of the group; and
it is infeasible to derive the integer factor based on knowing the element product and the element factor.

16. The delegatee device according to claim 15, wherein the group is based on elliptic-curve cryptography.

17. A non-transitory computer readable medium storing a computer program for providing a privacy-enhanced delegated access right to unlock a physical lock, the computer program comprising computer program code which, when executed on a delegatee device causes the delegatee device to:
obtain a derivation scalar;
receive a cryptographically signed delegation from a delegator device, the delegation being a data object comprising a public key of the delegator device, a public key of the physical lock, a derived public key for the delegatee device, wherein the derived public key is derivable using a source public key of the delegatee device and the derivation scalar, and wherein the delegation is cryptographically signed using a secret key that is paired with the public key of the delegator device;
obtain a source secret key for the delegatee device, the source secret key being paired with the source public key;
calculate a derived secret key for the delegatee device using the source secret key for the delegatee device and the derivation scalar, wherein the derived secret key and the derived public key form a temporary key pair;
provide the delegation to the physical lock; and
authenticate the delegatee device with the physical lock using the derived secret key.

18. A method for providing a privacy-enhanced delegated access right to unlock a physical lock to a delegatee device, the method being performed by a delegator device, the method comprising:
obtaining a derivation scalar;
obtaining a source public key for the delegatee device;
calculating a derived public key for the delegatee device based on the source public key and the derivation scalar;
generating a delegation being a data object comprising a public key of the delegator device, a public key of the physical lock, and the derived public key for the delegatee device;
cryptographically signing the delegation using a secret key paired with the public key of the delegator device; and
sending the cryptographically signed delegation to the delegatee device, wherein the delegation is usable by the delegatee device to authenticate with the physical lock using a derived secret key generated from the derivation scalar.

19. The method according to claim 18, wherein the obtaining the derivation scalar comprises generating the derivation scalar and the sending comprises sending the derivation scalar to the delegatee device.

20. A delegator device for providing a privacy-enhanced delegated access right to unlock a physical lock to a delegatee device, the delegator device comprising:
a processor; and
a memory storing instructions that, when executed by the processor, cause the delegator device to:
obtain a derivation scalar;
obtain a source public key for the delegatee device;
calculate a derived public key for the delegatee device based on the source public key and the derivation scalar;
generate a delegation being a data object comprising a public key of the delegator device, a public key of the physical lock, and the derived public key for the delegatee device;
cryptographically sign the delegation using a secret key paired with the public key of the delegator device; and
send the cryptographically signed delegation to the delegatee device, wherein the delegation is usable by the delegatee device to authenticate with the physical lock using a derived secret key generated from the derivation scalar.

21. A non-transitory computer readable medium storing a computer program for providing a privacy-enhanced delegated access right to unlock a physical lock to a delegatee device, the computer program comprising computer program code which, when executed on a delegator device causes the delegator device to:
a processor; and
a memory storing instructions that, when executed by the processor, cause the delegator device to:
obtain a derivation scalar;
obtain a source public key for the delegatee device;
calculate a derived public key for the delegatee device based on the source public key and the derivation scalar;
generate a delegation being a data object comprising a public key of the delegator device, a public key of the physical lock, and the derived public key for the delegatee device;
cryptographically sign the delegation using a secret key paired with the public key of the delegator device; and
send the cryptographically signed delegation to the delegatee device, wherein the delegation is usable by the delegatee device to authenticate with the physical lock using a derived secret key generated from the derivation scalar.

22. A system comprising a delegator device and a delegatee device for providing a privacy-enhanced delegated access right to unlock a physical lock, the delegator device comprising:
   a processor; and
   a memory storing instructions that, when executed by the processor of the delegator device, cause the delegator device to:
      obtain a derivation scalar;
      obtain a source public key for the delegatee device;
      calculate a derived public key for the delegatee device based on the source public key and the derivation scalar;
      generate a delegation being a data object comprising a public key of the delegator device, a public key of the physical lock, and the derived public key for the delegatee device;
      cryptographically sign the delegation using a secret key paired with the public key of the delegator device; and
      send the cryptographically signed delegation to the delegatee device; and
   the delegatee device comprising:
      a processor; and
      a memory storing instructions that, when executed by the processor of the delegatee device, cause the delegatee device to:
         obtain the derivation scalar;
         receive the cryptographically signed delegation from the delegator device, wherein the derived public key is derivable using the source public key of the delegatee device and the derivation scalar;
         obtain a source secret key for the delegatee device, the source secret key being paired with the source public key;
      calculate a derived secret key for the delegatee device using the source secret key for the delegatee device and the derivation scalar, wherein the derived secret key and the derived public key form a temporary key pair;
      provide the delegation to the physical lock; and
      authenticate the delegatee device with the physical lock using the derived secret key.

* * * * *